United States Patent
Yoo et al.

(10) Patent No.: US 8,260,382 B2
(45) Date of Patent: Sep. 4, 2012

(54) PORTABLE SLIDING WIRELESS COMMUNICATION TERMINAL

(75) Inventors: Jea-Suk Yoo, Seoul (KR); Chang-Bai Won, Seoul (KR); Chang-Jea Kim, Seoul (KR); In-Suk Yoo, Gyeonggi-Do (KR); Jung-Youl Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1079 days.

(21) Appl. No.: 12/176,973

(22) Filed: Jul. 21, 2008

(65) Prior Publication Data

US 2009/0137293 A1     May 28, 2009

(30) Foreign Application Priority Data

Nov. 27, 2007 (KR) .......................... 10-2007-0121742

(51) Int. Cl.
*H04M 1/00* (2006.01)
(52) U.S. Cl. ................................... 455/575.4; 455/550.1
(58) Field of Classification Search .... 455/575.1–575.4, 455/550.1, 566, 90.1
See application file for complete search history.

(56) References Cited

U.S. PATENT DOCUMENTS

| | | | |
|---|---|---|---|
| 2002/0187803 A1* | 12/2002 | Nakamura et al. | 455/550 |
| 2005/0046740 A1 | 3/2005 | Davis | |
| 2005/0049017 A1* | 3/2005 | Yoda | 455/575.1 |
| 2009/0061956 A1* | 3/2009 | Matsuoka | 455/575.1 |

FOREIGN PATENT DOCUMENTS

| | | |
|---|---|---|
| EP | 1441488 | 7/2004 |
| EP | 1471715 | 10/2004 |
| EP | 1622364 | 2/2006 |

* cited by examiner

*Primary Examiner* — Michael Faragalla
(74) *Attorney, Agent, or Firm* — Lee, Hong, Degerman, Kang & Waimey

(57) ABSTRACT

A mobile terminal for use in a wireless communication includes a first slide member, a second slide member, and a shielded cable. The first slide member includes a first surface having a display module and a second surface having a circuitry for controlling the mobile terminal, and opposite side edges configured to operate as slide guides. The first slide member is substantially covered with a front case. The second slide member includes opposite facing slide rails to slidably engage the opposite side edges of the first slide member. The first and second slide members are operatively coupled using an elastic module to bias the first and second slide members to one of open and closed positions. The shielded cable electronically couples a battery disposed in the second slide member to the circuitry disposed in the first slide member.

18 Claims, 11 Drawing Sheets

PORTABLE SLIDING WIRELESS COMMUNICATION TERMINAL

CROSS-REFERENCE TO RELATED APPLICATION

Pursuant to 35 U.S.C. §119(a), this application claims the benefit of earlier filing date and right of priority to Korean Application No. 10-2007-0121742, filed on Nov. 27, 2007, the contents of which are hereby incorporated by reference herein in their entirety.

FIELD OF THE INVENTION

The present invention relates to a slim portable wireless communication terminal having a slide module.

DESCRIPTION OF THE RELATED ART

Portable mobile terminals can be easily carried and perform various functions such as supporting voice calls and telephony calls, inputting and/or outputting information, and storing data. As the portable terminals become multifunctional, they can be implemented as an integrated multimedia device to capture still images or moving images, play music or video files, play games, or receive broadcast.

Various hardware or software have been developed in order to implement such multi functions. For example, a user interface environment is provided in order for users to easily and conveniently retrieve or select functions.

Further, various designs have been provided for the portable terminal to meet various preference of the users. For example, various designs, such as a folder type, a slide type, a bar type, and a rotation type, have been applied to the portable terminal, and efforts have been made to develop slimmer portable terminals.

SUMMARY OF THE INVENTION

In one embodiment of the present invention, a mobile terminal for use in a wireless communication has a first body and a second body slidably connected to the first body. The mobile terminal includes a first slide member comprising a first surface having a display module and a second surface having a circuitry for controlling the mobile terminal, and opposite side edges configured to operate as slide guides, wherein the first slide member is substantially covered with a front case; a second slide member comprising opposite facing slide rails to slidably engage the opposite side edges of the first slide member, the first and second slide members operatively coupled using an elastic module to bias the first and second slide members to one of open and closed positions, the second slide member comprising a first surface having a first input interface and a second surface substantially covered with a second slide cover that is configured to receive a battery to power the mobile terminal; and a shielded cable electronically coupling the battery disposed in the second slide member to the circuitry disposed in the first slide member.

Preferably, the first slide member further includes a second input interface for receiving user input to operate the mobile terminal even when the mobile terminal is in the closed position. The front case substantially encloses the display module and a rear case substantially encloses the circuitry.

In one aspect of the present invention, the rear case includes an upper portion and a lower portion, the upper portion protruding outwardly over the lower portion. The upper portion of the rear case may be fully exposed in both the open and closed positions. The lower portion of the rear case is fully covered by the battery cover in the closed position. The lower portion of the rear case is substantially exposed and recessed compared to a surface of the battery cover when the mobile terminal is in the open position.

In another aspect of the present invention, the mobile terminal further includes a rear case that substantially encloses the circuitry and a releasable battery cover that substantially encloses the battery. A surface of the battery cover and a surface of the rear case form a level rear surface of the mobile terminal in the closed position.

The mobile terminal may further include an image input unit at a portion of the rear case, the image input unit exposed in the open position and covered by the battery cover in the closed position. The mobile terminal may also include an interface at a lateral surface of the rear case, the interface exposed in the open position and covered by the battery cover in the closed position. The rear case is substantially inserted into the second slide cover, a portion of the rear case being inserted into the second slide cover varying according to the one of the open and closed positions.

In yet another aspect of the present invention, the mobile terminal further includes a protrusion extending from the second slide member at a point lower than electronic connection points of the shielded cable and is disposed to limit upward movement of the shielded cable beyond the protrusion when the first and second slide members slide to transition from the closed position to the open position. Preferably, the shielded cable includes a curved portion and the first slide member stops when the curved portion of the shielded cable contacts the protrusion when opening the mobile terminal. Preferably, the shielded cable includes a coaxial cable.

The mobile terminal further includes a battery cover that is releasably attached to the second slide cover and substantially encloses the battery. The circuitry of the first slide member and a battery mount portion of the second slide member are provided with first and second electronic connection points for electrically connecting the circuitry and the battery by the shielded cable.

The second slide member may include a through hole, into which the shielded cable is inserted, for guiding movement of the shielded cable when the mobile terminal transitions between the open and closed positions. Preferably, at least one of the first input interface and the second input interface includes a touch screen or touch pad. Alternatively, the first input interface may include a key pad.

In one embodiment of the present invention, a mobile terminal for use in a wireless communication includes a first body with a first slide member, the first slide member including opposite side edges configured to operate as slide guides; a second body with a second slide member, the second slide member including opposite facing slide rails to slidably engage the opposite side edges of the first slide member; and a shielded cable electronically coupling a battery disposed in the second slide member to a circuitry disposed in the first slide member, wherein the first body and the second body are slidably coupled via the first slide member and the second slide member, and configured to be in one of open and closed positions, a portion of the first body substantially inserted into the second body.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF PREFERRED EMBODIMENTS

The above and other features and advantages of the present invention will become more apparent by describing in detail preferred embodiments thereof with reference to the attached drawings.

Figure 1:
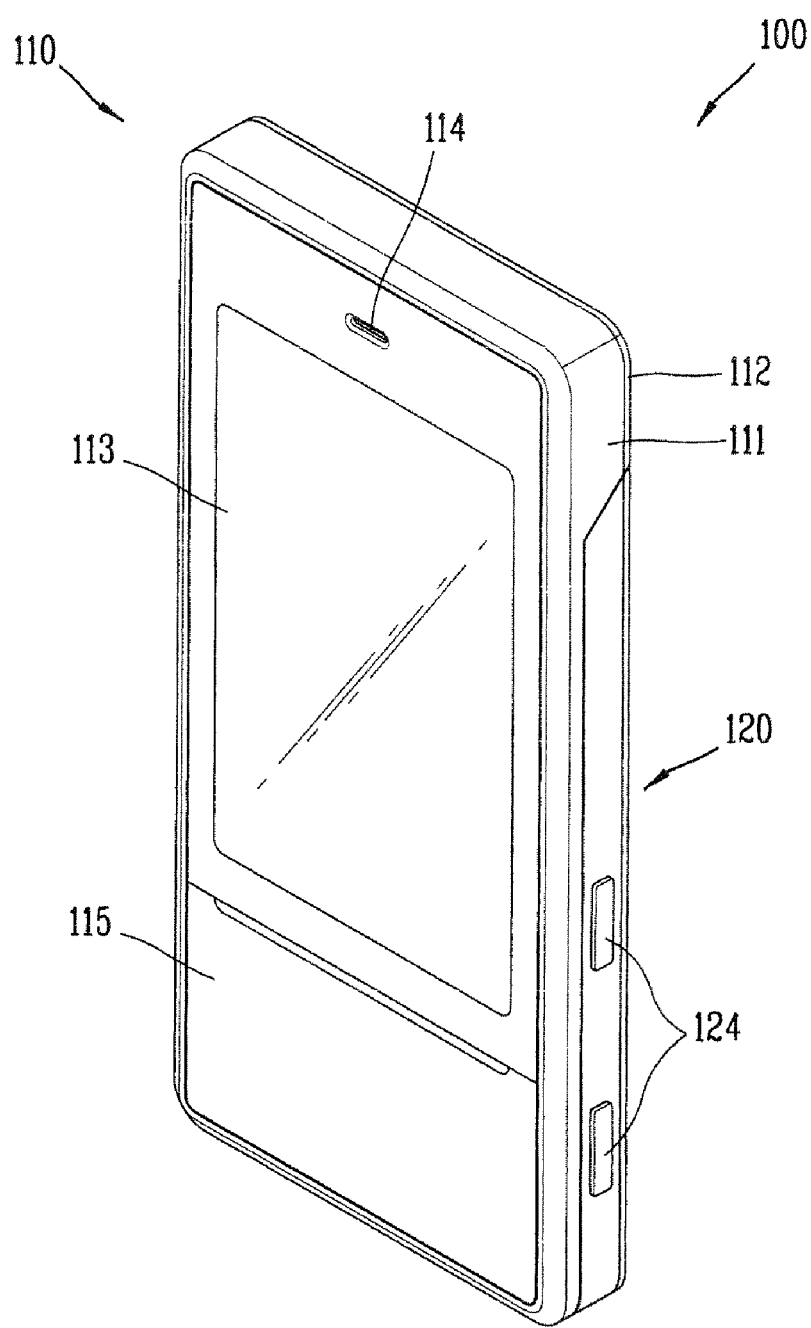
FIGS. 1 and 2 are front perspective views showing closed and open positions, respectively, of a mobile terminal according to one embodiment of the present invention.
Figure 2:
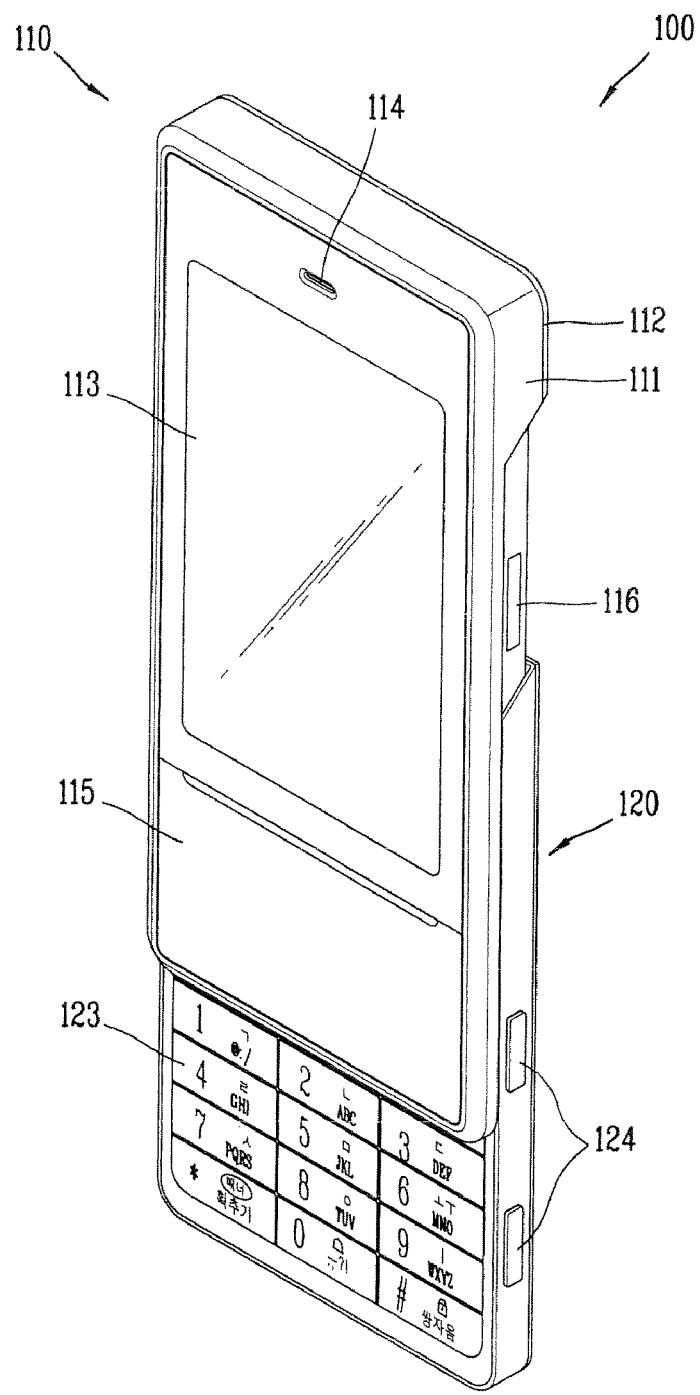

Referring to FIGS. 1 and 2, the mobile terminal 100 of the present invention includes a first body 110 and a second body 120 configured to be slidable with respect to the first body in at least one direction. As shown in FIG. 1, the configuration in which the first body 110 covers the entire second body 120 such that the mobile terminal 100 appears as a single body is referred to as a closed position. As shown in FIG. 2, the configuration in which at least a portion of the second body 120 is exposed from the first body 110 is referred to as an open position.

In the closed position, the mobile terminal 100 may be in a standby mode, but the standby mode may be released according to a user's manipulation of the terminal. In the open position, the mobile terminal 100 may be in a call mode, but the call mode may be switched into the standby mode according to the user's manipulation or after a predetermined duration of time.

A case, such as a casing, a housing, or a cover, forming the exterior of the first body 110 includes a front case 111 and a rear case 112. Electronic components are disposed in a space formed between the front case 111 and the rear case 112. The front and rear cases 111, 112 may be formed of a synthetic resin by injection molding, or a metallic material such as stainless steel (STS) or titanium (Ti).

A display portion 113, a first sound output unit 114, a first input interface 115, and an interface 116 may be disposed at the first body 110. The display portion 113 includes a Liquid Crystal Display (LCD) module and an Organic Light Emitting Diodes (OLED) module to visualize information. The display portion 113 may further include a touch screen so that the user may input information by touching the information displayed on the touch screen.

The first sound output unit 114 may be implemented as a receiver or a speaker. The first input interface 115 receives user commands for controlling the operation of the terminal 100.

The interface 116 serves as a path which allows the terminal 100 to exchange data with external devices. For example, the interface 116 may be used in a wired or wireless manner, and may be at least one of a connection terminal to which an earphone is connected, a power supply terminal for supplying power to the terminal 100, or a port for local communication, such as an infrared data (IrDA) port, a Bluetooth port or a wireless LAN port. Alternatively, the interface 116 may be a card socket for receiving an external card such as a Subscriber Identification Module (SIM), a User Identity Module (UIM), or a memory card for storing information.

Figure 4:
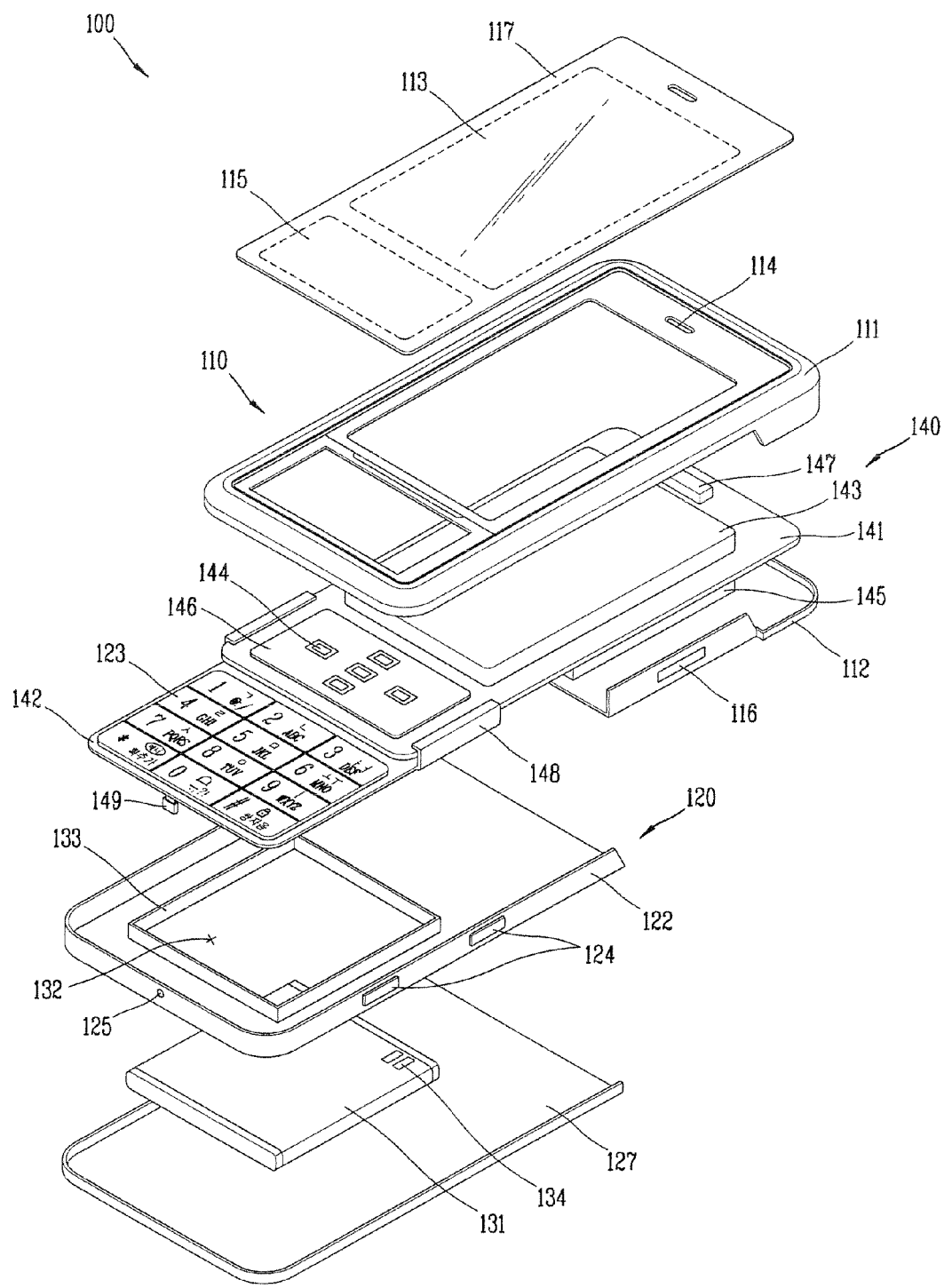
FIG. 4 is an exploded perspective view showing a mobile terminal according to one embodiment of the present invention.

The second body 120 may include second and third input interfaces 123, 124, and a sound input unit 125, as shown in FIG. 4. The first to third input interfaces 115, 123, 124 may be referred to as an input unit which are manipulated by a user in a tactile manner.

For example, the input units 115, 123, 124 may be implemented as a dome switch, a touch screen or a touch pad and the user may input commands or information by pushing or touching the input units. Alternatively, the input units may be implemented as a wheel, a jog, or a joystick.

Further, the first input interface 115 may be configured to input commands, such as start, end, or scroll, and the second input interface 123 may be configured to input figures, letters, or symbols. Furthermore, the third input interface 124 may be used as a hot key to perform a specific function, such as activating an image input unit 128. The sound input unit 125 may be a microphone to receive the user's voice or other external sound.

Figure 3:
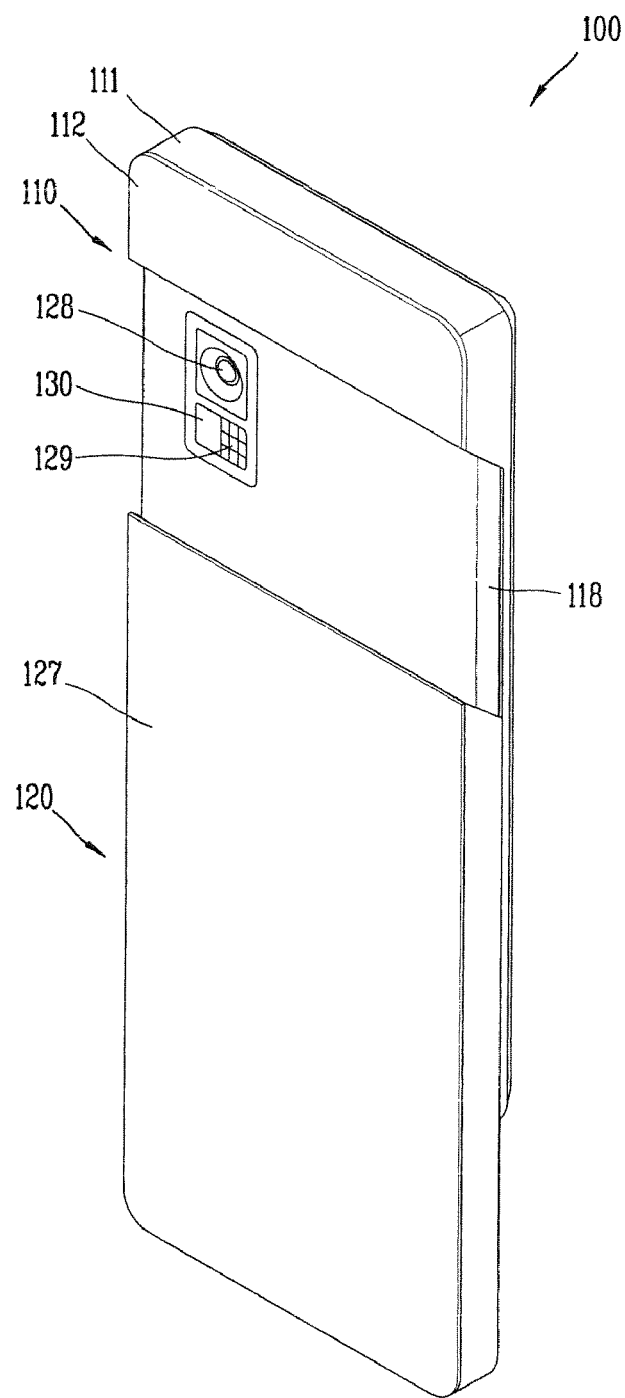
FIG. 3 is a rear perspective view showing a mobile terminal according to one embodiment of the present invention.

Referring to FIG. 3, the image input unit 128 may be located at a rear surface of the first body 110. The image input unit 128 may be a camera module for capturing still images or moving images. A flashlight 129 and a reflective surface 130 may be additionally disposed near the image input unit 128. When photographing a subject through the image input unit 128, the flashlight 129 flashes light on the subject. When the user photographs a self-portrait through the image input unit 128, the user may look at himself/herself on the reflective surface 130.

A recess portion 118 is formed at a lateral surface of the rear case 112 of the first body 110, the lateral surface siding with a rear surface of the rear case. When the second body 120 moves with respect to the first body 110, the second body slides over the recess portion 118 of the rear case 112. As shown in FIG. 3, the upper portion of the rear surface of the rear case 112 may be protruded compared to the rest of the rear surface of the rear case such that the surface of the protruded upper portion of the rear case is level with a surface of a battery cover 127 in the closed configuration. Alternatively, the rear surface of the rear case 112 of the first body 110 may be a single flat surface such that the rear surface of the rear case is entirely covered by the battery cover in the closed configuration. The battery cover 127 for covering a battery, which supplies power to the mobile terminal 100, may be detachably mounted at a rear surface of the second body 120.

Referring to FIG. 4, a slide module 140 couples the first and second bodies 110, 120 in a sliding manner. The slide module 140 includes a first slide member 141 and a second slide member 142 slidably coupled to the first slide member. The first and second slide members 141, 142 may be formed of a metallic material such as stainless steel (STS) or titanium (Ti).

The first slide member 141 is mounted in the first body 110, specifically, between the front case 111 and the rear case 112 of the first body. A display module 143, a touch sensor 144, and a printed circuit board 145 may be fixed at the first slide member 141.

A window 117 provided with a light translucent area may be mounted at the front case 111, and the display module 143 for displaying visual information through the window 117 is mounted at the front surface of the first slide member 141. A plurality of touch sensors 144 for sensing a touch input via the first input interface 115 may be disposed on a circuit board 146 located below the display module 143 on the first slide member. The plurality of touch sensors 144 may be arranged in a pattern such that each of the plurality of touch sensors is placed separately from each other. The circuit board 146, on which the plurality of touch sensors 144 are fixed, is mounted on the first slide member 141.

In an embodiment of the present invention, the first input interface 115 is manipulated by touching. Further, the first input interface 115 may be implemented as a keypad or switches on the first slide member 141 and manipulated by pressing. A sound output unit 147 for outputting sounds may be mounted on the first slide member 141 above the display module 143.

The printed circuit board 145, which is mounted at a rear surface of the first slide member 141, is provided with electronic components for operating various functions of the mobile terminal 100. For example, the electronic components of the printed circuit board 145 may include a controller for controlling the operation of the terminal 100 and a camera module for inputting images.

A pair of opposite facing slide rails 148 are formed at the second slide member 142 along the length of the first body 110, and a pair of opposite side edges of the first slide member 141 are inserted into the pair of slide rails such that the first slide member moves along the pair of slide rails. The second input interface 123, which is mounted at the front surface of the second slide member 142, may be implemented as a keypad assembly and information may be input by pressing the keypad. Alternatively, the second input interface 123 may be a touch screen and information may be input by touching the touch screen. A microphone 149 for inputting sounds may be mounted at a rear surface of the second slide member 142.

The second body 120 includes the second slide member 142 such that the second body moves with respect to the first body 110. Second slide cover 122 encloses the second slide member 142 and the rear case 112 of the first body 110. The third input interface 124 located on a lateral surface of the second slide cover 122 may be electrically connected to the printed circuit board 145 of the first body 110 by a flexible printed circuit board (FPCB).

The battery 131, which supplies power to the first body 110, is detachably mounted at a battery mount cavity 132 of the second slide cover 122. The battery 131 fits into the receiving walls 133 surrounding four sides of the battery mount cavity 132.

In the above described configuration according to an embodiment of the present invention, the first body 110 directly slides into the second body 120 via the slide module 140. Therefore, the mobile terminal 100 can be made to be slimmer than the conventional slide type terminal having two completely separate bodies combined such that one body is slidably mounted directly on top of the other body and no portion of one body is inserted into the other body. The mobile terminal 100 according to the present invention may appear as a bar type terminal having a single body in the closed position and as a slide type terminal having two separate bodies connected to each other in the open position.

In the present invention, the battery 131 in the second body 120 moves with respect to the printed circuit board 145 of the first body 110 when the first body slides over the second body to be in the open or closed position. Therefore, the terminal 100 according to the present invention needs to have a structure of which the battery 131 and the printed circuit board 145 are electrically connected to each other regardless of the variable distance between the battery and the printed circuit board. Connection of the battery 131 and the printed circuit board 145 in the mobile terminal 100 according to the present invention will be described below.

Figure 5A:
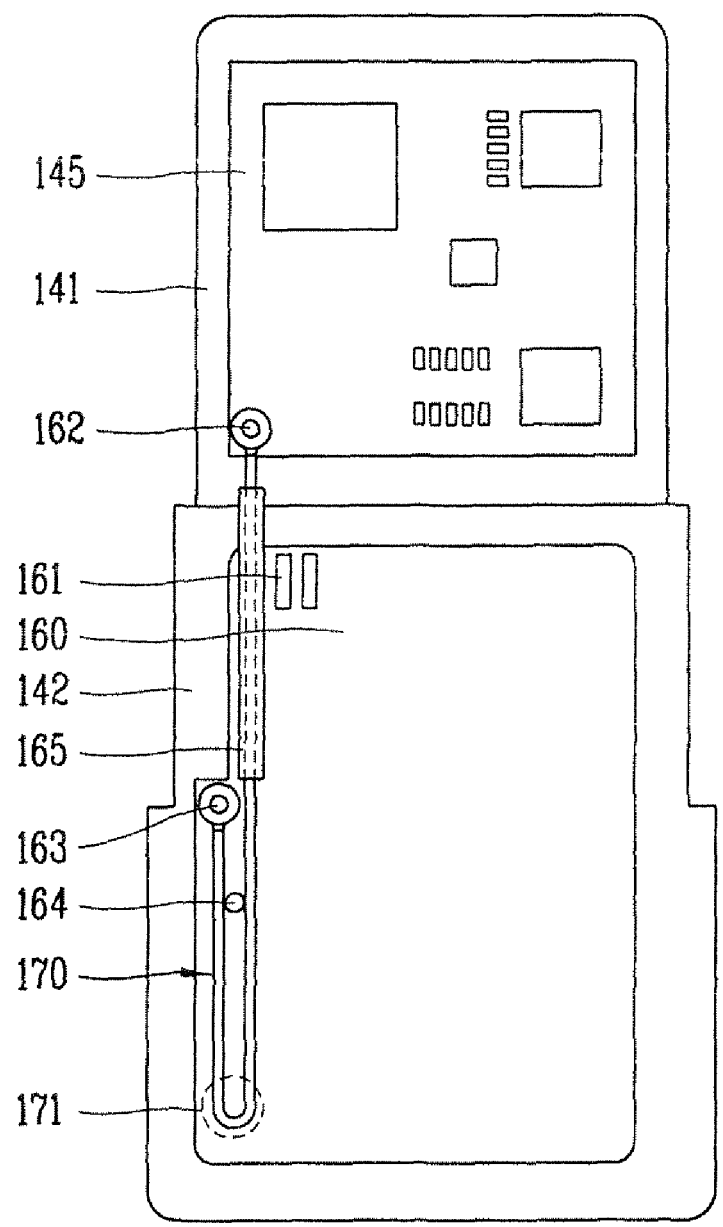
FIGS. 5a and 5b are bottom views of a slide module in a mobile terminal according to one embodiment of the present invention.
Figure 5B:
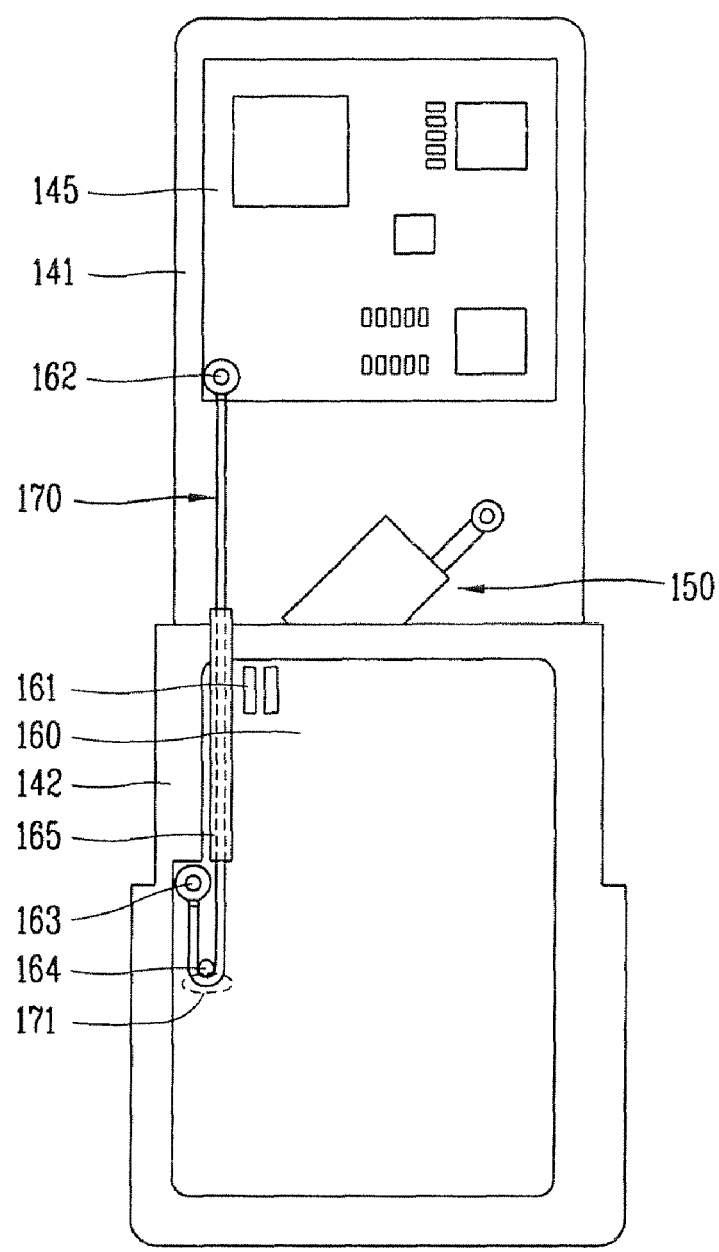

FIGS. 5A and 5B are bottom views of the slide module 140 according to an embodiment of the present invention. The rear surface of the slide module 140 is shown in the closed and open positions, respectively, in FIGS. 5A and 5B. Referring to FIGS. 5A and 5B, an elastic module 150 for providing an elastic force when the first and second slide members 141, 142 move with respect to each other is mounted between the first and second slide members. A battery mount portion 160 for mounting the battery 131 is formed at the rear surface of the second slide member 142. A contact terminal 161 is disposed at the battery mount portion 160 to be in contact with a contact terminal 134 of the battery 131 which is placed in the battery mount cavity 132 of the second slide cover 122.

A first connection point 162 is provided at the printed circuit board 145 mounted at the first slide member 141, and a second connection point 163 is provided at the battery mount portion 160 of the second slide member 142. The second connection point 163 is electrically connected to the contact terminal 161 by an electric wire.

The first connection point 162 and the second connection point 163 may be connected to each other by a coaxial cable 170, thus minimizing a mounting space. Further, the coaxial cable 170 provides more stable power supply regardless of an external noise, compared to the flexible printed circuit board (FPCB). The first and second connection points 162, 163 may be disposed on the same side, for example, left or right side, of the printed circuit board 145 and the battery mount portion 160.

For example, in FIGS. 5A and 5B, the first and second connection points 162, 163 are disposed on the left side of the printed circuit board 145 and the battery mount portion 160. The coaxial cable 170 connecting the first and second connection points 162, 163 is also disposed on the left side of the battery mount portion 160 in parallel with a sliding direction of the first and second slide members 141, 142.

The coaxial cable 170 may be longer than the actual distance between the first and second connection points 162, 163 in the open position such that the coaxial cable is curved by 180 degrees at a curved portion 171. As shown in FIG. 5B, a protrusion 164 may be extending from the second slide member 142 between two parallel lines of the coaxial cable 170 to limit upward movement of the coaxial cable when opening the mobile terminal 100 by sliding the first body 110 with respect to the second body 120 such that the protrusion blocks the movement of the coaxial cable by contacting the curved portion 171 of the coaxial cable.

Further, a guide member 165 guiding the movement of the coaxial cable 170 may be formed at the second slide member 142. The guide member 165 is provided with a through hole and the coaxial cable 170 moves through the through hole. When the mobile terminal 100 is transitioned from the closed position to the open position by relative movement of the first and second slide members 141, 142, the coaxial cable 170 moves through the guide member 165. The guide member 165 prevents the coaxial cable 170 from being twisted during the transition and the curved portion 171 of the coaxial cable 170 stops at the protrusion 164 when the terminal 100 transitions to the open position.

Figure 6A:
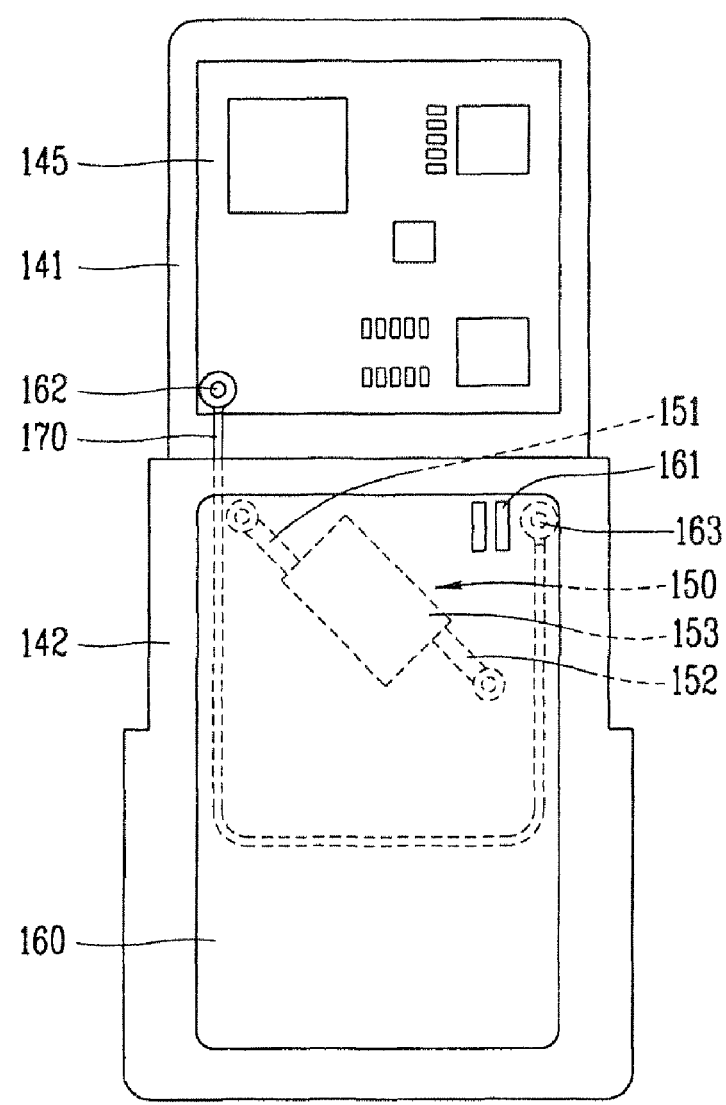
FIGS. 6a and 6b are bottom views of a slide module in a mobile terminal according to one embodiment of the present invention.
Figure 6B:
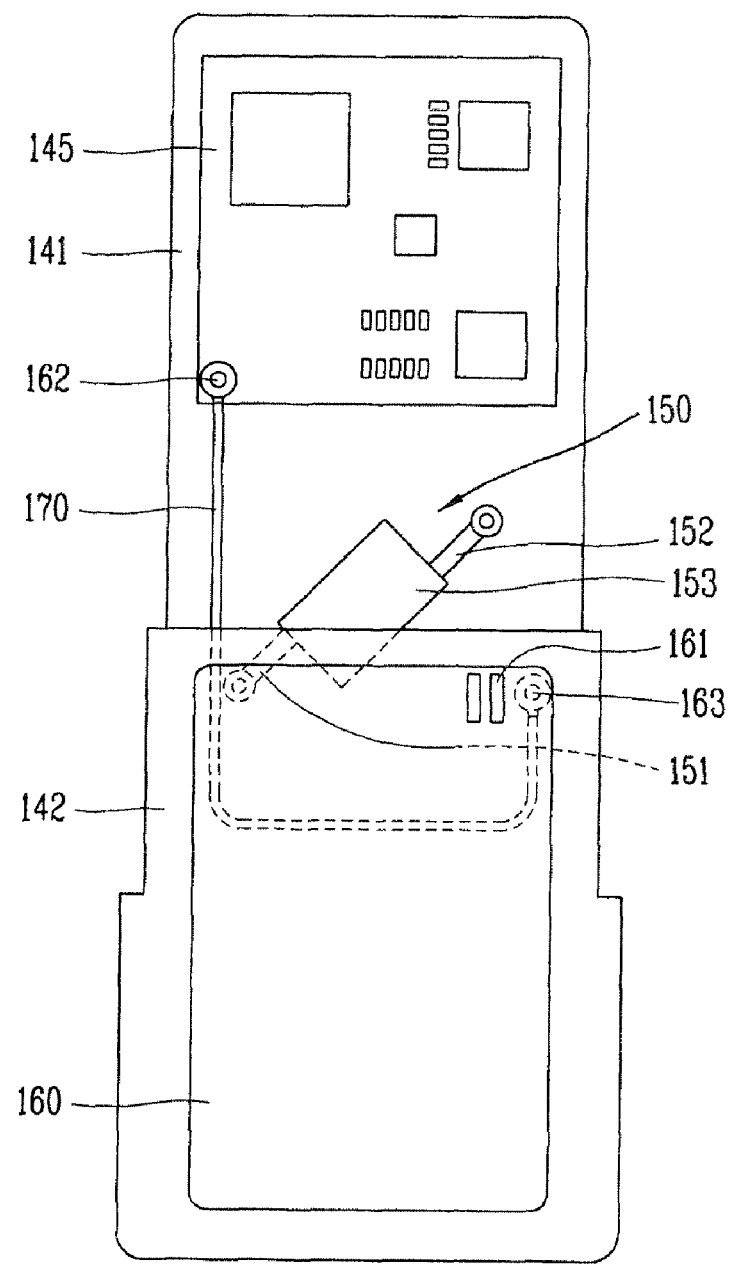

FIGS. 6A and 6B are bottom views of the slide module 140 according to an embodiment of the present invention. FIGS. 6A and 6B show the rear surface of the slide module 140 in the closed and open configurations, respectively.

The elastic module 150 may be disposed between facing surfaces of the first and second slide members 141, 142 to open and close the first and second bodies 110, 120 semiautomatically by sliding the first and second slide members. The elastic module 150 may include a main body 153 and first and second rods 151, 152 coupled to the main body. One end of the first rod 151 is rotatably coupled to the first slide member 141 and the other end is linearly and movably coupled to the main body 153. One end of the second rod 152 is rotatably coupled to the second slide member 142 and the other end is linearly and movably coupled to the main body 153.

The first and second rods 151, 152 are supported by springs mounted in the main body 153, and compress the springs by linearly moving in the main body when the first and second slide members 141, 142 move with respect to each other to transition between the closed and open positions. Depending on the distance between the first and second slide members 141, 142, the springs are compressed or tensioned, providing the elastic force between the first and second slide members 141, 142 in a direction of the movement.

According to an embodiment of the present invention, the printed circuit board 145 and the battery mount portion 160 may be provided with the first and second connection points 162, 163, respectively, which are coupled to each other by the coaxial cable 170. The first connection points 62 is disposed on the left side of the elastic module 150 and the second connection point 163 is disposed on the right side of the elastic module. The coaxial cable 170 may be disposed along a circumference of the elastic module 150. The coaxial cable 170 is long enough to encompass a portion of the elastic module 150 even in the open configuration.

The coaxial cable 170 is disposed along the circumference of the elastic module 150 to maximize a radius of curvature thereof, to prevent the coaxial cable 170 from being disconnected. The first connection point 162 may be disposed at the left side and the second connection point 163 may be disposed at the right side, or vice versa.

A configuration in which the coaxial cable 170 is connected to the first and second connection points 162, 163 will be described. The coaxial cable 170 is connected to the first connection point 162 formed on the printed circuit board 145. However, a similar configuration may also be applied to the second connection point 163.

Figure 7:
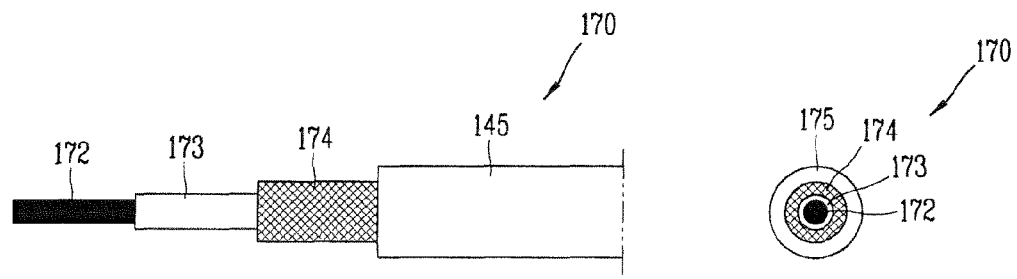
FIG. 7 illustrates a side surface and a sectional surface of a coaxial cable according to one embodiment of the present invention.

Referring to FIG. 7, the coaxial cable 170 includes an inner conductor 172 disposed at the center of the coaxial cable, an insulator 173 enclosing the inner conductor, an outer conductor 174 enclosing the insulator, and an outer coating 175 enclosing the outer conductor to form the exterior of the coaxial cable. The outer coating 175 is formed of an insulating material.

Figure 8:
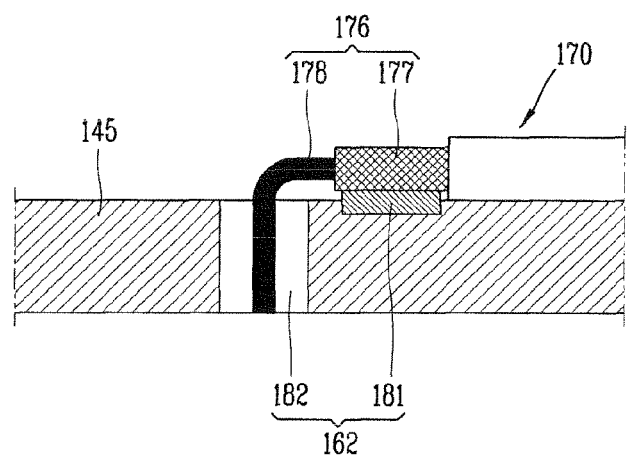
FIG. 8 illustrates a configuration of a coaxial cable and a first connection point which are connected to each other in a mobile terminal according to one embodiment of the present invention.

Referring to FIG. 8, a connecting unit 176 for performing an electric connection is formed at an end portion of the coaxial cable 170. The connecting unit 176 may include a first connecting portion 177 in which the outer conductor 174 is exposed, and a second connecting portion 178 extended from the first connecting portion 177 such that the inner conductor 172 is exposed. The first connecting portion 177 is formed not to have the outer coating 175 forming the exterior of the coaxial cable 170 and the second connecting portion 178 is formed not to have the outer coating 175, the outer conductor 174 and the insulator 173.

The first connection point 162 of the printed circuit board 145 includes first and second electrodes 181, 182 contacting the first and second connecting portions 177, 178, respectively. The first electrode 181 is provided on the printed circuit board 145 and contacts the lateral surface of the first connecting portion 177, and the second electrode 182 is formed at an inner wall of the through hole formed at the printed circuit board and contacts the second connecting portion 178 which is inserted into the through hole. The first and second connecting portions 177, 178 may be connected to the first and second electrodes 181, 182, respectively, by soldering. The second connecting portion 178 is curved toward the through hole and configured to be inserted into the through hole.

The first connecting portion 177 and the first electrode 181 have the same polarity, and the second connecting portion 178 and the second electrode 182 have the same polarity. Moreover, if the first electrode 181 has a positive pole, the second electrode has a negative pole and vice versa.

According to the above described configuration, the coaxial cable 170 is connected to the first and second connection points 162, 163. Further, the second connecting portion 178 is configured to be inserted into the through hole formed at the first connection point 162 to provide more stable connection structure.

Figure 9:
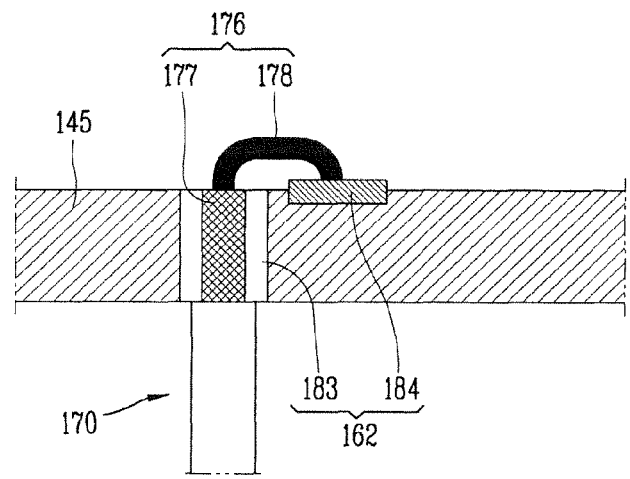
FIG. 9 illustrates a configuration of a coaxial cable and a connection point which are connected to each other in a mobile terminal according to one embodiment of the present invention.

Referring to FIG. 9, an alternative configuration for connecting the coaxial cable 170 to the first connection point 162 is described. In the alternative configuration, the first connection point 162 includes first and second electrodes 183, 184 which contact the first and second connecting portions 177, 178, respectively. The first electrode 183 is formed at the inner wall of the through hole formed at the printed circuit board 145 and configured to contact the first connecting portion 177 by being inserted thereinto. The second electrode 184 is disposed on the printed circuit board 145 and configured to be connected to the second connecting portion 178. The second connecting portion 178 is curved by 180 degrees after passing through the through hole, and connected to the second electrode 184. The first and second electrodes 183, 184 may be connected to the first and second connecting portions 177, 178 by soldering.

Figure 10:
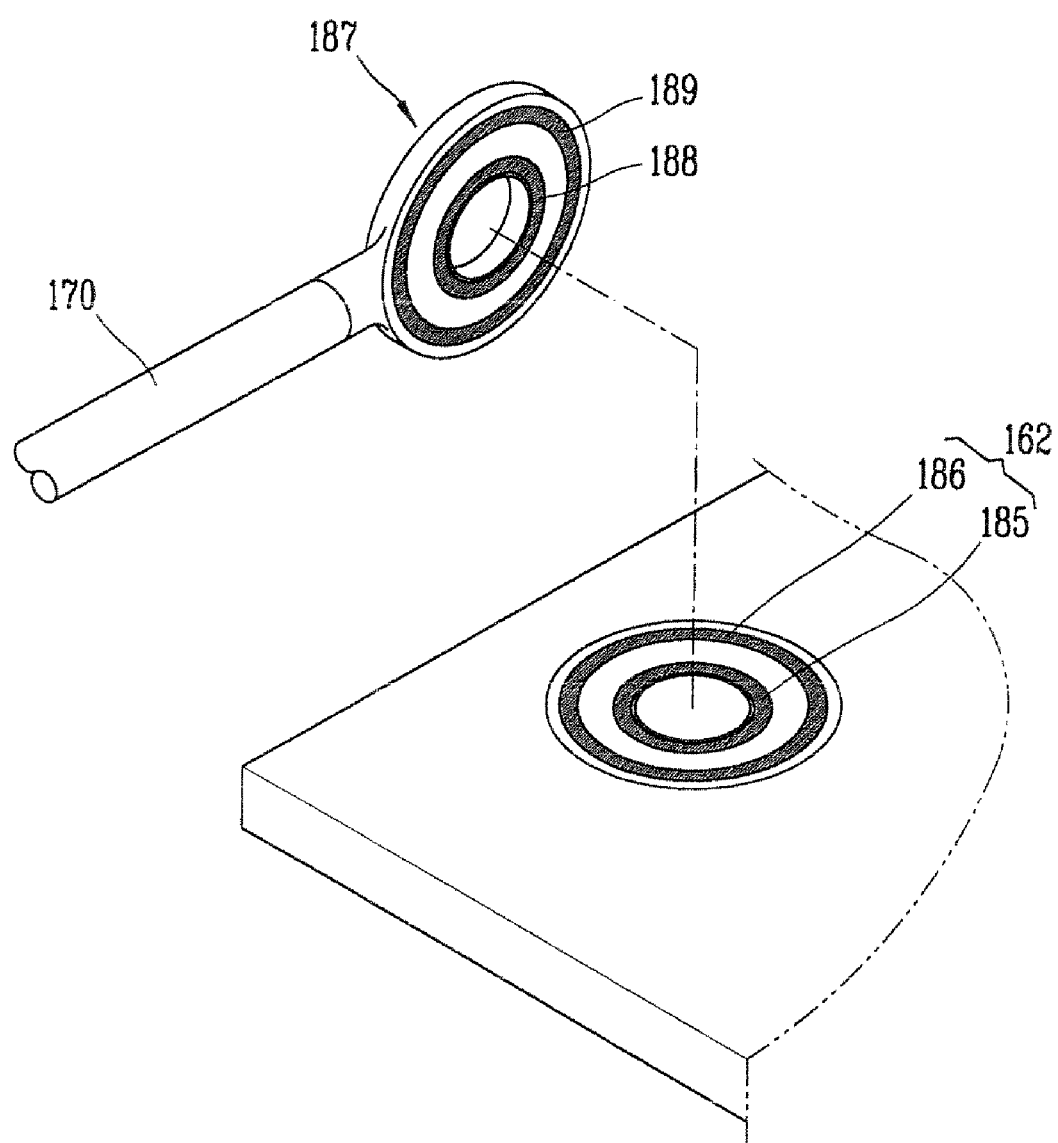
FIG. 10 illustrates a connector for connecting a coaxial cable and a first connection point in a mobile terminal according to one embodiment of the present invention.

Referring to FIG. 10, a connector 187 connects the coaxial cable 170 and the first connection point 162. Although the coaxial cable 170 is connected to the first connection point 162 in FIG. 10, the coaxial cable may also be applied to the second connection point 163.

The first connection point 162 includes a first electrode 185 formed on the printed circuit board 145 and a second electrode 186 formed on the same plane as the first electrode. The first and second electrodes 185, 186 may be formed in a concentric circular shape. The second electrode 186 may be disposed outside the circumference of the first electrode 185.

The connector 187 may be formed in a donut shape and have one side provided with a connecting portion connected to the coaxial cable 170. First and second connector electrodes 188, 189, having the concentric circle shape, are provided at one surface of the connector 187 to correspond to the first and second electrodes 185, 186, respectively, on the printed circuit board 145. The first and second connector electrodes 188, 189 may be connected to the inner conductor 172 and the outer conductor 174, respectively, of the coaxial cable 170.

Upon connecting the connector 187 to the first connection point 162 by soldering, the first electrode 185 and the first connector electrode 188 are electrically connected to each other, and the second electrode 186 and the second connector electrode 189 are electrically connected to each other. The first electrode 185 and the first connector electrode 188 have the same polarity, and the second electrode 186 and the second connector electrode 189 have the same polarity.

Figure 11:
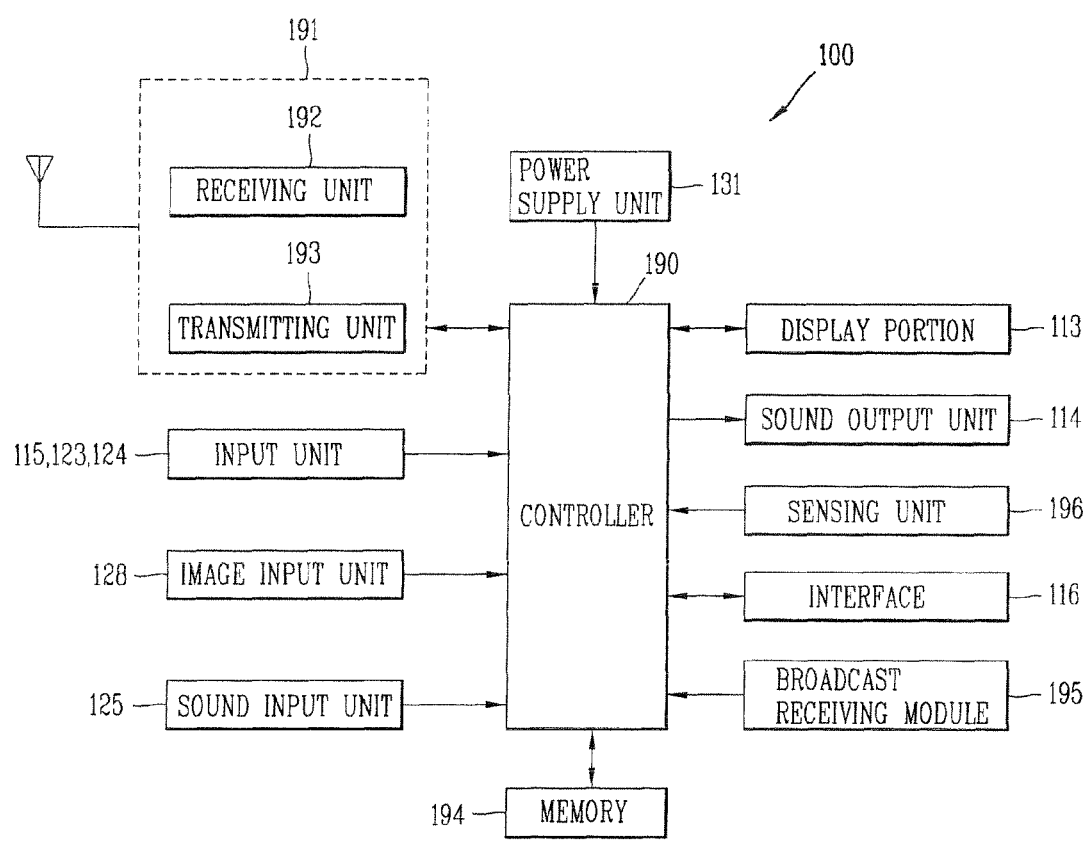
FIG. 11 is a block diagram illustrating a mobile terminal according to one embodiment of the present invention.

Referring to FIG. 11, the mobile terminal 100 according to an embodiment of the present invention includes a radio (wireless) communication module 191, input units 115, 123, 124, an image input unit 128, a sound input unit 125, a display portion 113, a sound output unit 114, a sensing unit 196, an interface 116, a broadcast receiving module 195, a memory 194, a power supply unit 131, and a controller 190.

The controller 190 generally controls the overall operation of the terminal 100. For example, the controller 190 controls and processes operations such as voice calls, data communication, and video calls.

The radio communication module 191 transmits/receives radio signals to/from a mobile communication base station through an antenna. For example, the radio communication module 191 transmits/receives voice data, text data, image data and control data under control of the controller 190. The radio communication module 191 includes a transmitting unit 193 for modulating and transmitting signals and a receiving unit 192 for demodulating the received signals.

The input unit or input interface 115, 123, 124 are configured as shown in FIGS. 1 and 2 to receive data input by the user for controlling the operation of the terminal 100 with the controller 190. The image input unit 128 processes an image frame such as still images and moving images that are obtained by an image sensor in an image call mode or a photographing mode. The processed image frame is converted into image data to be output and displayed on the display portion 113. The image frame processed by the image input unit 128 may be stored in the memory 194 by the controlling unit 190 or transmitted through the radio communication module 191.

The sound input unit 125 receives external sound signals through the microphone during a call mode, a recording mode, or a voice recognition mode and then processes the received sound signals into electric voice data. During the call mode, the processed voice data is converted and output to the mobile communication base station through the radio communication module 191. In the recording mode, the processed voice data is output to be stored in the memory 194. In the sound input unit 125, various noise removing algorithm may be implemented to remove noise generated during the process of receiving external sound signals.

On the display portion 113, information processed in the terminal 100 is output to be displayed. For example, when the terminal 100 is in the call mode, a UI (User Interface) or a GUI (Graphic User Interface) related to the call is displayed on the display portion 113 by the controlling unit 190. When the terminal 100 is in the video call mode or the photographing mode, the photographed images, the UI or the GUI related to the corresponding mode is displayed on the display portion 113 by the controlling unit 190. In one embodiment of the present invention, the display portion 113 may be used as an input device by being implemented as a touch screen.

The sound output unit 114 outputs the sound data received from the radio communication module 191 or stored in the memory 194 in a call signal receiving mode, the call mode, the recording mode, the voice recognition mode, or the broadcast receiving mode. The sound output unit 114 also outputs sound signals related to functions performed in the terminal 100, such as call signal receiving sound and message receiving sounds.

The sensing unit 196 generates sensing signals for controlling the operation of the terminal 100 by sensing the current status of the terminal. The sensing unit 196 may sense an open/closed status and a position of the terminal 100, and also determines whether a user is contacting the terminal. For example, the sensing unit 196 senses whether the terminal 100 is in the open or closed status, and then outputs the sensed result to the controller 190 to control the operation of the terminal. The sensing unit 196 also senses whether the power is supplied in the power supply unit 131 and whether the interface 116 is coupled to external devices.

The interface 116 serves to electrically connect all external devices such as a wire/wireless headset, an external charger, a wire/wireless data port, a card socket, such as memory card and SIM/UIM card, to the terminal 100. Such interface 116 allows the data or power transmitted or supplied from the external device to be transferred to each component of the terminal 100, or the data in the terminal to be transmitted to the external device.

In the memory 194, a program for processing and controlling the controller 190 may be stored, or input/output data, such as phonebook, messages, still images, and moving images, may also be stored. Further, a program controlling the operation of the terminal 100 may be stored in the memory 194. Such memory 194 may be implemented as a hard disk, a flash memory, a RAM, a ROM, and a card-type memory, such as SD and XD memory.

The broadcast receiving module 195 receives broadcast signals transmitted through a satellite wave or a ground wave and outputs the received broadcast signals to the controller 190 by converting the signals into broadcast data that can be output to the sound output unit 114 and the display portion 113. The broadcast receiving module 195 may receive additional data related to the broadcasting, such as EPG (Electric Program Guide) and channel list. The additional data and the broadcast data converted by the broadcast receiving module 195 may be stored in the memory 194. The power supply unit 131 supplies power to operate each component.

In the present invention, the first components mounted in the first body are fixed to the first slide member and the second components mounted in the second body are fixed to the second slide member, achieving a terminal having a slimmer thickness. Further, a new type of opening/closing structure according to the present invention provides implementation of a bar type terminal in the closed configuration and a slide type terminal in the open configuration. Furthermore, in the present invention, the printed circuit board and the battery are connected to each other through the coaxial cable, thereby minimizing the mounting space and stably supplying power regardless of the external noise.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A mobile terminal for use in a wireless communication, the mobile terminal comprising:
   a first body having a front case and a rear case coupled to the front case;
   a second body;
   a slide module configured to couple the first and second bodies to each other in a sliding manner such that the first body is slidably movable to open and closed positions, wherein the slide module comprises:
   a first slide member mounted in the first body and covered with the front case and the rear case, the first slide member comprising a first surface having a display module, a second surface having a circuitry for controlling the mobile terminal, and side edges serving as slide guides; and
   a second slide member comprising slide rails facing each other and slidably engaged with the side edges of the first slide member such that the second slide member is slidable with respect to the first slide member in a planar direction, a first surface having a first input interface, and a second surface substantially covered with a slide cover which accommodates therein a battery to supply power to the mobile terminal; and a battery cover disposed to cover the battery and coupled to the slide cover, wherein the rear case comprises an upper portion and a lower portion, the upper portion protruding outwardly over the lower portion
   a shielded cable configured to electronically couple the battery disposed in the second slide member to the circuitry disposed in the first slide member; and
   a protrusion protruding from the second slide member at a point lower than electronic connection points of the shielded cable and is disposed to limit upward movement of the shielded cable beyond the protrusion when the first and second slide members slide to transition from the closed position to the open position, and
   wherein a surface of the battery cover and the upper portion of the rear case form a plane in the closed position and wherein the shielded cable comprises a curved portion and the first slide member stops when the curved portion of the shielded cable contacts the protrusion when opening the mobile terminal.

2. The mobile terminal of claim 1, wherein the first slide member further comprises a second input interface for receiving user input to operate the mobile terminal even when the mobile terminal is in the closed position.

3. The mobile terminal of claim 1, wherein the upper portion of the rear case is fully exposed in both the open and closed positions.

4. The mobile terminal of claim 1, wherein the lower portion of the rear case is fully covered by the battery cover in the closed position.

5. The mobile terminal of claim 1, wherein the lower portion of the rear case is substantially exposed and recessed compared to a surface of the battery cover when the mobile terminal is in the open position.

6. The mobile terminal of claim 1, further comprising an image input unit at a portion of the rear case, the image input unit exposed in the open position and covered by the battery cover in the closed position.

7. The mobile terminal of claim 1, further comprising an interface at a lateral surface of the rear case, the interface exposed in the open position and covered by the battery cover in the closed position.

8. The mobile terminal of claim 1, wherein the rear case is substantially inserted into the slide cover, a portion of the rear case being inserted into the slide cover varying according to one of the open and closed positions.

9. The mobile terminal of claim 1, wherein the shielded cable comprises a coaxial cable.

10. The mobile terminal of claim 1, wherein the circuitry of the first slide member and a battery mount portion of the second slide member are provided with first and second electronic connection points for electrically connecting the circuitry and the battery by the shielded cable.

11. The mobile terminal of claim 1, wherein the second slide member comprises a guide member having a through hole, into which the shielded cable is inserted, for guiding movement of the shielded cable when the mobile terminal transitions between the open and closed positions.

12. The mobile terminal of claim 2, wherein at least one of the first input interface and the second input interface comprises a touch screen or touch pad.

13. The mobile terminal of claim 1, wherein the first input interface comprises a key pad.

14. The mobile terminal of claim 1, wherein the battery cover is releasably attached to the slide cover.

15. The mobile terminal of claim 1, wherein the battery cover is integrally formed with the slide cover.

16. The mobile terminal of claim 1, further comprising an elastic module mounted between the first and second slide members for providing an elastic force when the first and second slide members move with respect to each other.

17. The mobile terminal of claim 4, further comprising an image input unit at the lower portion of the rear case, the image input unit exposed in the open position and covered by the battery cover in the closed position.

18. The mobile terminal of claim 4, wherein the rear case is substantially inserted into the slide cover, the lower portion of the rear case being inserted into the slide cover varying between the open and closed positions.

* * * * *